Aug. 14, 1956  J. L. BONANNO  2,758,801
FISHING REEL
Original Filed July 6, 1949
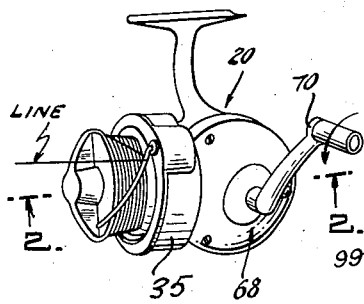
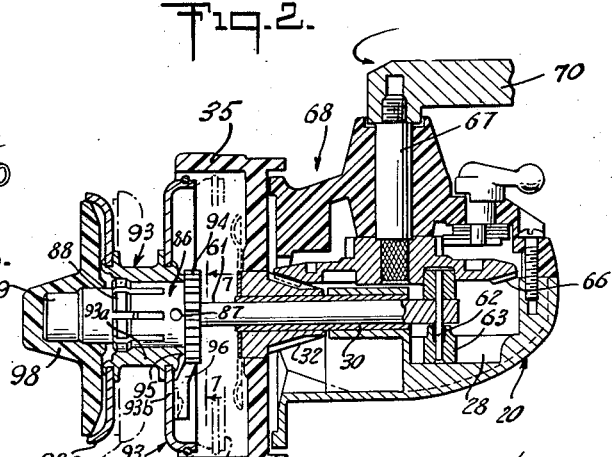
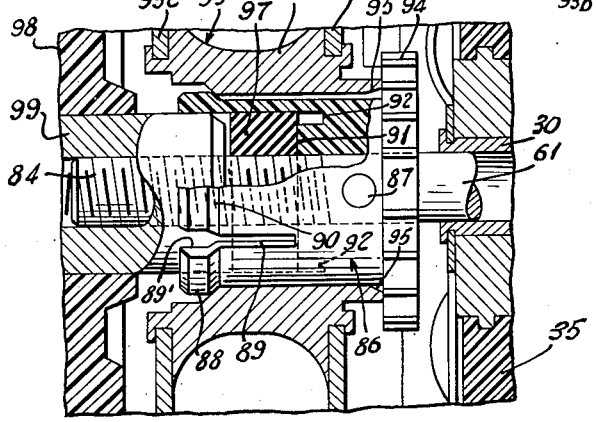
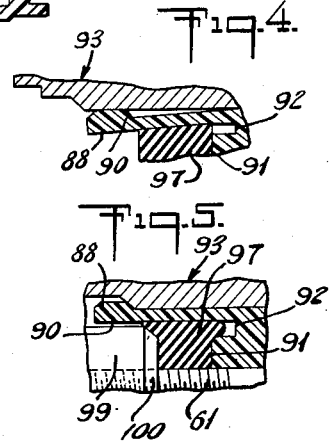
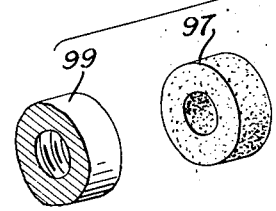
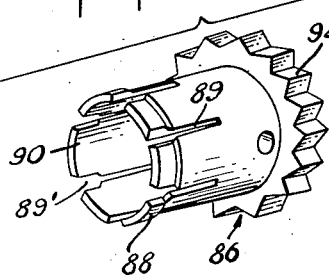
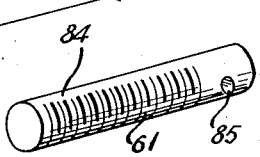
INVENTOR
JOSEPH L. BONANNO
BY
ATTORNEY

United States Patent Office 2,758,801
Patented Aug. 14, 1956

2,758,801

FISHING REEL

Joseph L. Bonanno, South Orange, N. J., assignor to Airex Manufacturing Co., Inc., New York, N. Y., a corporation of New York Original application July 6, 1949, Serial No. 103,221, now Patent No. 2,705,113, dated March 29, 1955. Divided and this application September 3, 1953, Serial No. 378,214

7 Claims. (Cl. 242—84.6)

The present invention relates to fishing reels and is more particularly directed toward fishing reels of the spinning reel type. The present invention contemplates spinning reels constructed in the main from die cast and plastic parts so as to be capable of mass production at low cost.

In spinning reels of the type to which the present invention is directed, the line is wound and unwound from a spool normally held against rotation. The line is wound on to the spool by a revolving cup carrying a pickup finger which can be manually shifted to a position where it frees the line to pass off the stationary spool, but shiftable, when the cup is revolved in the direction to wind up line, to a position to engage the line and guide it on to the spool as the cup is revolved. In reels of this character, the spool is carried on a non-rotatable reciprocating shaft and a winding crank is provided with mechanism for reciprocating the spool shaft and rotating the cup.

The pull exerted by the line is transmitted to the spool and tends to unwind the line off the spool. This unwinding is resisted by the operator holding on the winding crank or by anti-reverse mechanism where the same is employed. To limit the pull which can be exerted on the line to a safe amount, it is desirable to provide such reels with friction brake mechanism adjustable at the will of the operator.

According to the present invention the spinning reel is provided with a brake member non-rotatably carried on the spool shaft and carrying the spool in such a manner that it can freely turn relative to the brake member or can be held against turning by variable friction imposed by a readily adjustable manually operable device.

Other and further objects of the invention will appear as the description proceeds.

The accompanying drawings show, for purposes of illustrating the present invention, one embodiment in which the invention may take form, it being understood that the drawings are illustrative of the invention rather than limiting the same.

In these drawings,

Figure 1 is a perspective view of the assembled reel;

Figure 2 is a longitudinal sectional view on the plane 2—2 of Figure 1;

Figure 3 is an enlarged sectional view on the same plane as Figure 1, showing the friction brake mechanism, spool, and spool shaft, the parts being in position to free the spool from frictional drag;

Figure 4 is a fragmentary view showing the spool partly moved to position on the friction brake;

Figure 5 is a fragmentary sectional view showing the friction brake adjusted to impose friction;

Figure 6 is an exploded perspective view of parts employed in the friction brake mechanism; and Figure 7 is a fragmentary sectional view on the line 7—7 of Figure 2.

The friction brake mechanism herein is shown in the drawings as embodied in a spinning reel having a fixed die cast body member 20, a molded plastic housing cover 68, an operating handle 70, drive shaft 67, bevel gear 66, and bevel pinion 32, drivingly connected to a spool cup 35. The spool shaft indicated at 61 is rotatably mounted in a bushing 30 and guided for reciprocation in the bushing by a pin 62 and roller 63 carried in a groove 28 in body casting 20. This mechanism is all described in greater detail in my Patent No. 2,705,113, granted March 29, 1955, of which the present application is a division.

The end of the spool shaft 61 which extends through the spool cup is threaded as indicated at 84 and drilled as indicated at 85. A combined brake housing and click gear element 86 is received on the shaft and held in place by a pin 87. This element is preferably made of tough, resilient plastic unaffected by the heat generated during slippage, such for example as nylon. The brake housing has an open ended tubular portion thickened at the end as indicated at 88 and provided with longitudinal slits, narrow as indicated at 89 and wide as indicated at 89', so as to provide bendable segments 90. The housing has an inner shoulder 91 and a recess 92 beyond the shoulder.

A spool 93 composed of a spool body 93a, an inner spinning 93b, and an outer spinning 93c, has a bore of a proper diameter to loosely fit over the portion of the brake housing between the enlargement 88 and the click gear 94, adapted to cooperate with a spool carried click spring as shown in the application above referred to. The inner end of the spool body is slightly chamfered as indicated at 95 so that when it is pushed along the segments 90 these segments are cammed inwardly as indicated in Fig. 4. When the spool is pushed all the way on to the brake housing, the segments expand to the position of Fig. 3 so that the spool can revolve freely. The spool element 93b carries a click spring 96 cooperable with the click gear 94. A soft compressible washer 97 is received on the shaft 61. This washer is preferably made of "neoprene" 50—60 durometer test and of a size to be received in the brake housing and is brought against the shoulder 91.

The threaded end 84 of the shaft 61 receives a control knob 98 molded on an insert 99 threaded to fit the shaft. The inner end 100 of this insert is adapted, as more clearly shown in Fig. 3, to enter the brake housing member 86, but does not expand it. When, however, the knob 98 is turned to force the insert against the washer, pressure may be applied to the washer 97, which will cause the washer to deform as indicated in Fig. 5, applying pressure to fingers on the brake housing and causing them to expand and frictionally grip the spool so as to resist turning of the spool on the brake housing. This varies in accordance with the pressure which is developed by tightening the knob 98. When the knob 98 is backed off to reduce the drag, the spool is freed to turn without drag before the end of the nut 99 leaves the rubber washer. This insures friction between the insert and washer so that the knob is held against free unthreading.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. In a fishing reel having a normally non-rotatable spool onto which line is wound by line pickup mechanism revolvable about the reel, brake mechanism for varying the pull on the line required to turn the spool backwardly, comprising a non-rotatable spool shaft, a brake member non-rotatably carried by the shaft and on which the spool is revolvably carried, the brake member having an open ended tubular portion with longitudinal slits to provide bendable segments, a deformable ring carried on the shaft within the segments, and an adjusting knob threaded onto the shaft and bearing on the deformable ring to press the same inwardly and cause expansion of the segments to bring them into frictional engagement with the bore of the spool.

2. A fishing reel such as claimed in claim 1, wherein the brake member is in the form of a nylon molding and the deformable ring is of soft rubber.

3. A fishing reel such as claimed in claim 1, wherein the inner end of the brake member has a shoulder engaging the inner end of the spool, the bore in the outer end of the spool is enlarged and the outer end of the brake member is also enlarged so as to snap outwardly when the spool is brought against the shoulder.

4. A fishing reel such as claimed in claim 1, wherein the inner end of the brake member is enlarged to form a stop shoulder for the spool and the enlarged portion has teeth for cooperation with a spool carried click spring, and the spool carries a click spring.

5. A fishing reel such as claimed in claim 1, wherein the brake member has a hub portion to limit the inward movement of the deformable ring and an annular recess into which a peripheral portion of the ring flows under pressure.

6. In a brake mechanism for fishing reels, a shaft, a brake body having a hub adjacent one end fixedly carried by the shaft and having a series of longitudinal segments spaced from the shaft extending away from the hub end and separated by slots, the segments forming a cylindrical outer surface adapted to frictionally engage inside a spool, a resilient rubber-like washer carried on the shaft bearing against the inner face of the hub and the inner surfaces of the segments to resist inward bending of the segments, and a nut threaded on the shaft and bearing against the washer for expanding the washer and pressing the segments outwardly.

7. In a fishing reel a winding mechanism having a normally non-rotatable spool to receive a line, a manually operable winding mechanism rotatable about the spool for placing the line on the spool, and a spool brake comprising a spool bearing member inside the spool, a non-rotatable shaft on which the spool bearing member is non-rotatably mounted, the spool bearing member having a hub, a longitudinally slitted portion extending from the hub outside the shaft to form segments bendable toward and away from the shaft, a deformable ring about the shaft and inside the segments, and a member threaded on the shaft and bearing against the ring to apply pressure to press it against the hub and force the segments outwardly against the spool.

References Cited in the file of this patent

UNITED STATES PATENTS

| | | |
|---|---|---|
| 712,536 | Hill | Nov. 4, 1902 |
| 1,678,710 | Selvig | July 31, 1928 |
| 1,842,718 | Dunlap | Jan. 26, 1932 |
| 2,066,659 | Templeton et al. | Jan. 5, 1937 |
| 2,520,126 | Collard | Aug. 29, 1950 |

FOREIGN PATENTS

| | | |
|---|---|---|
| 448,436 | Germany | Aug. 19, 1927 |